Nov. 13, 1951     F. W. SEYBOLD ET AL     2,574,501
GUILLOTINE KNIFE-IMPROVED VALUES FOR HYDRAULIC CLAMPS
Filed Sept. 9, 1949     14 Sheets-Sheet 1
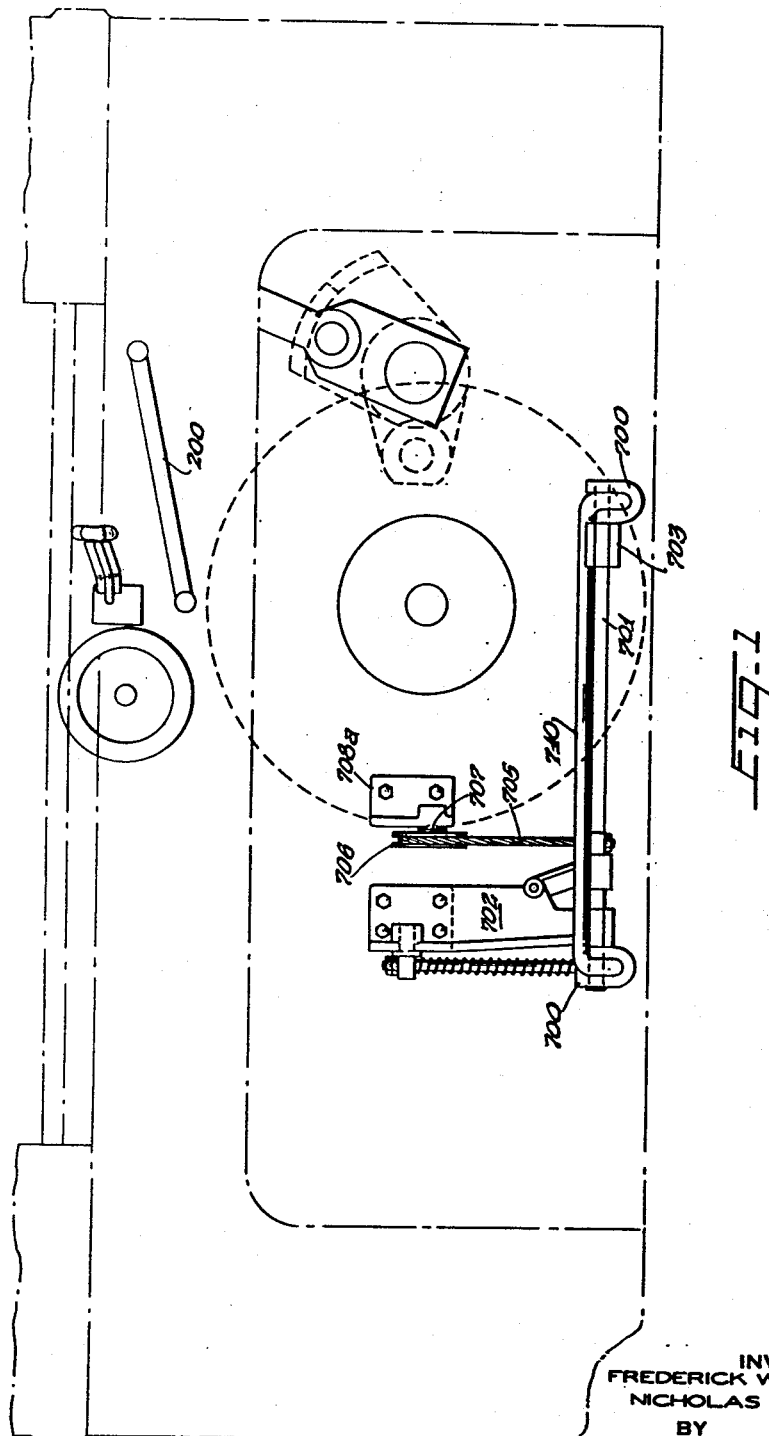
INVENTORS
FREDERICK W. SEYBOLD
NICHOLAS HERMAN
BY
*Ostrolenk & Faber*
ATTORNEYS

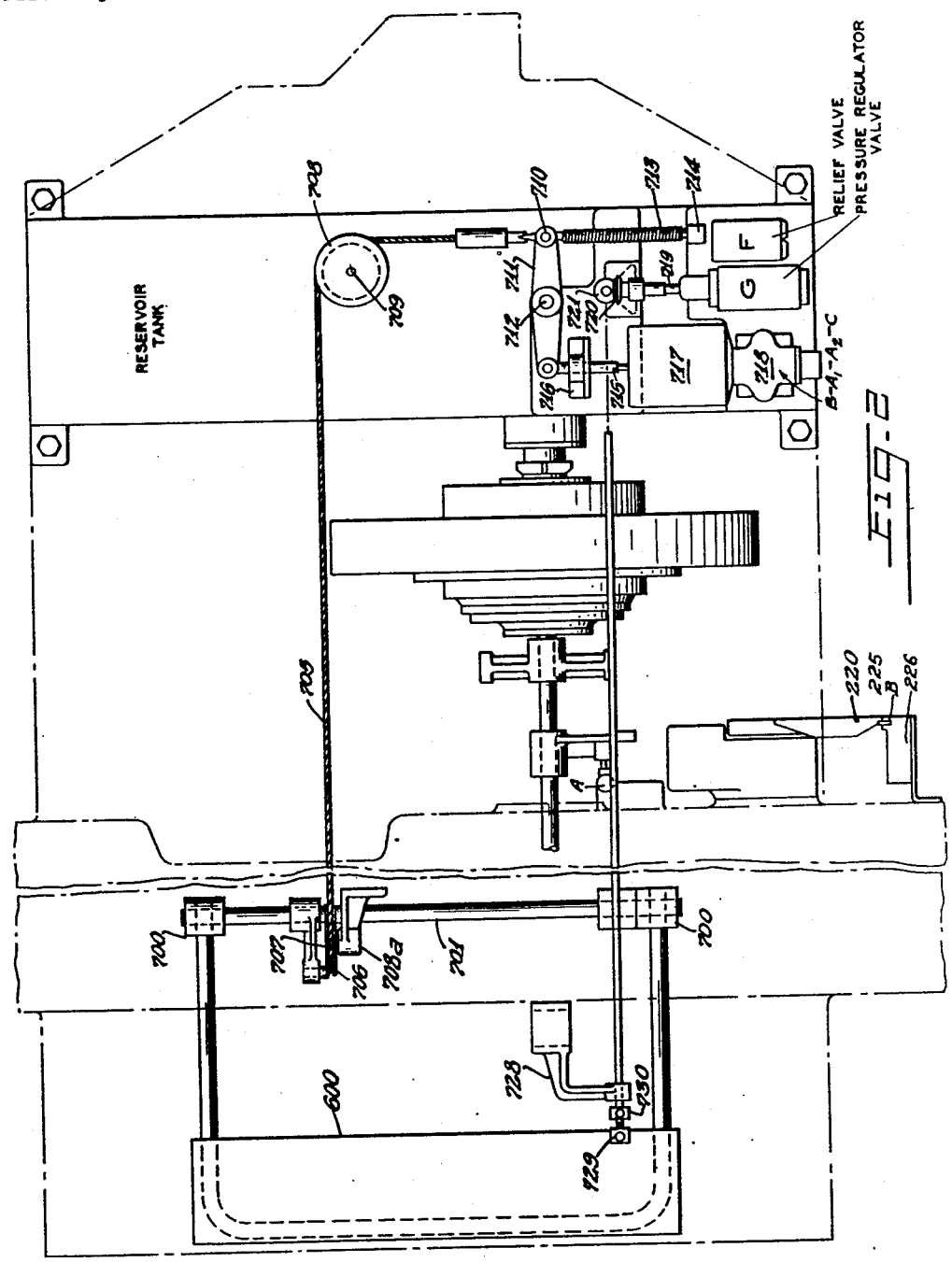

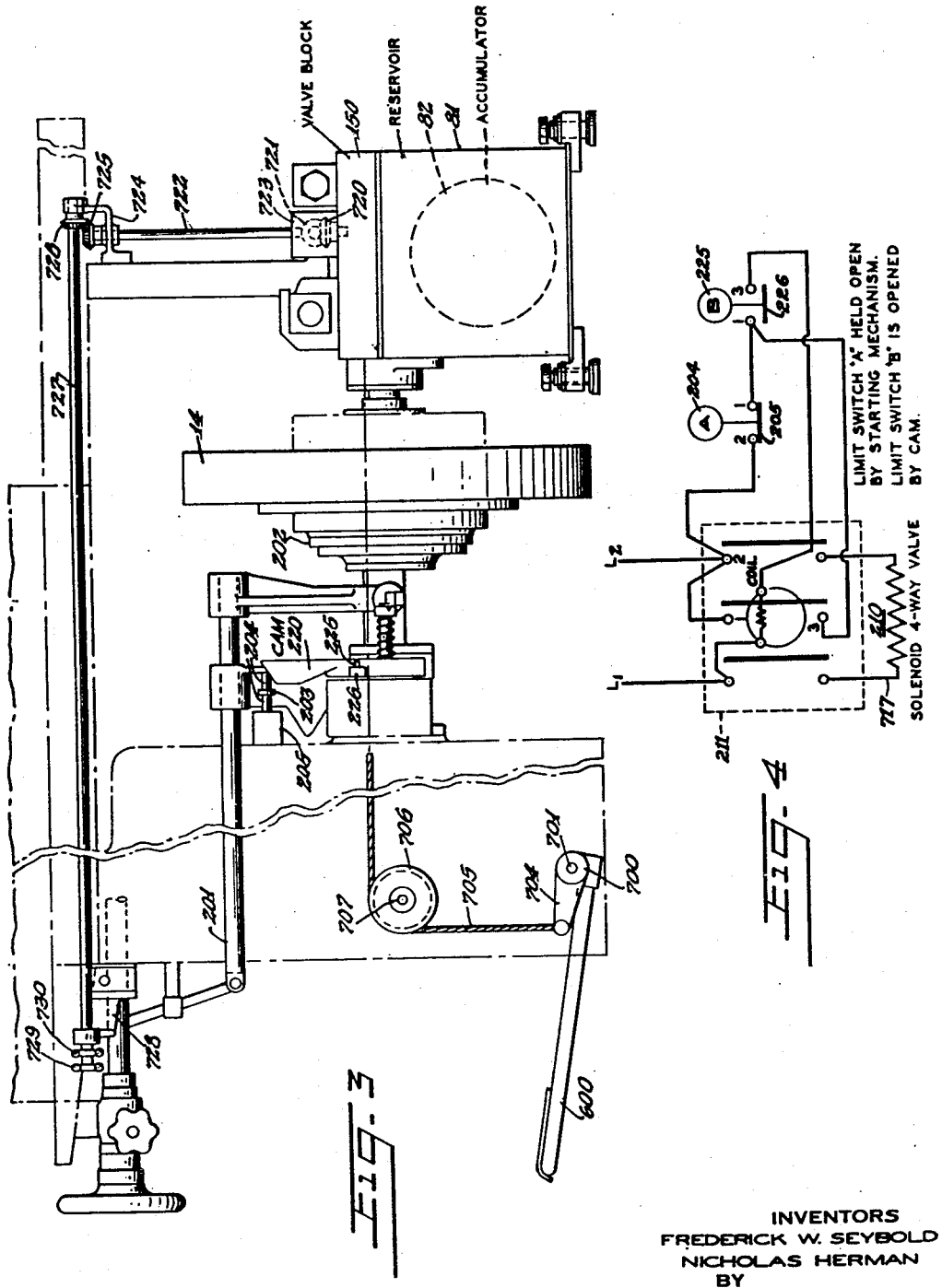

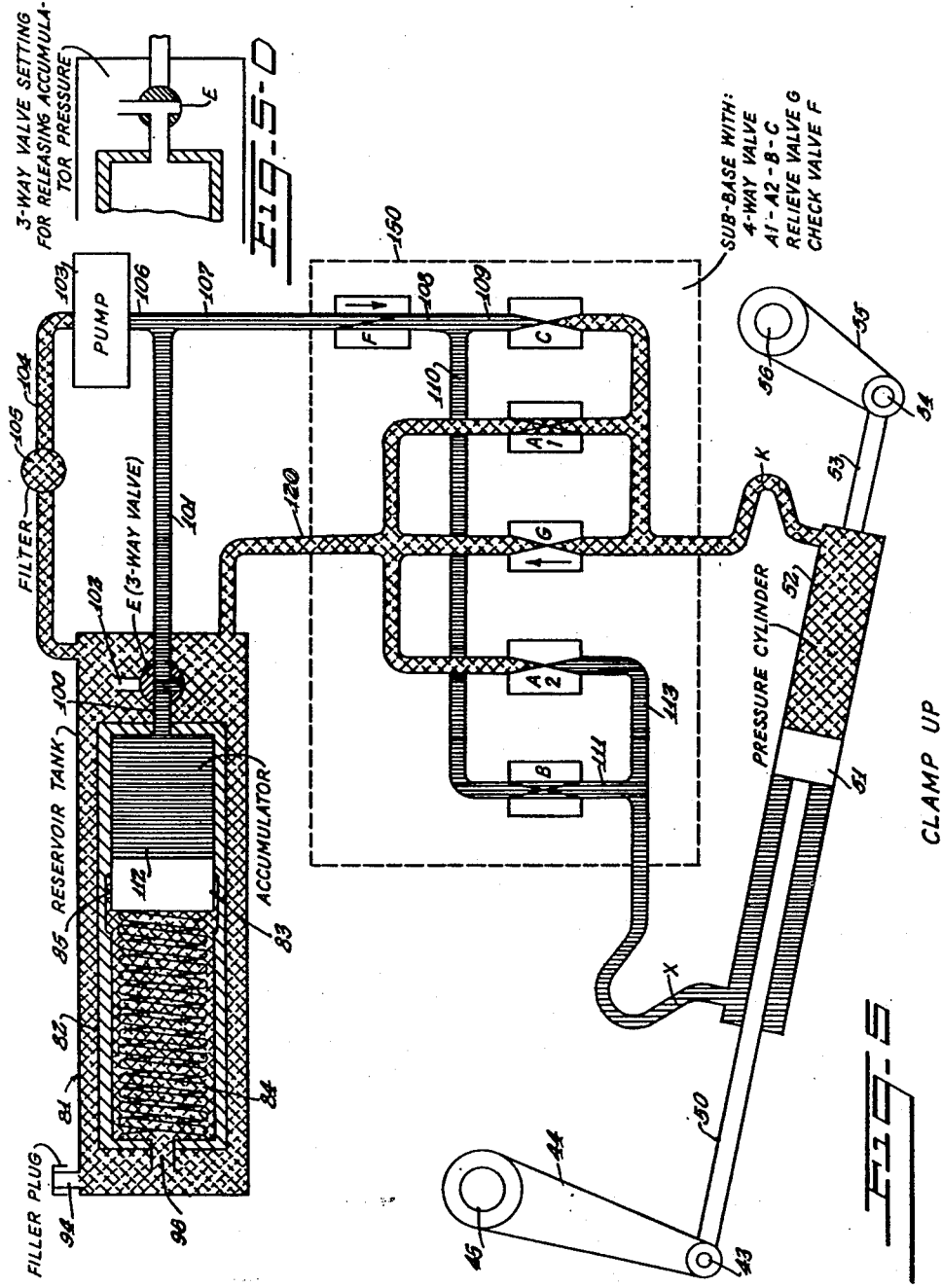

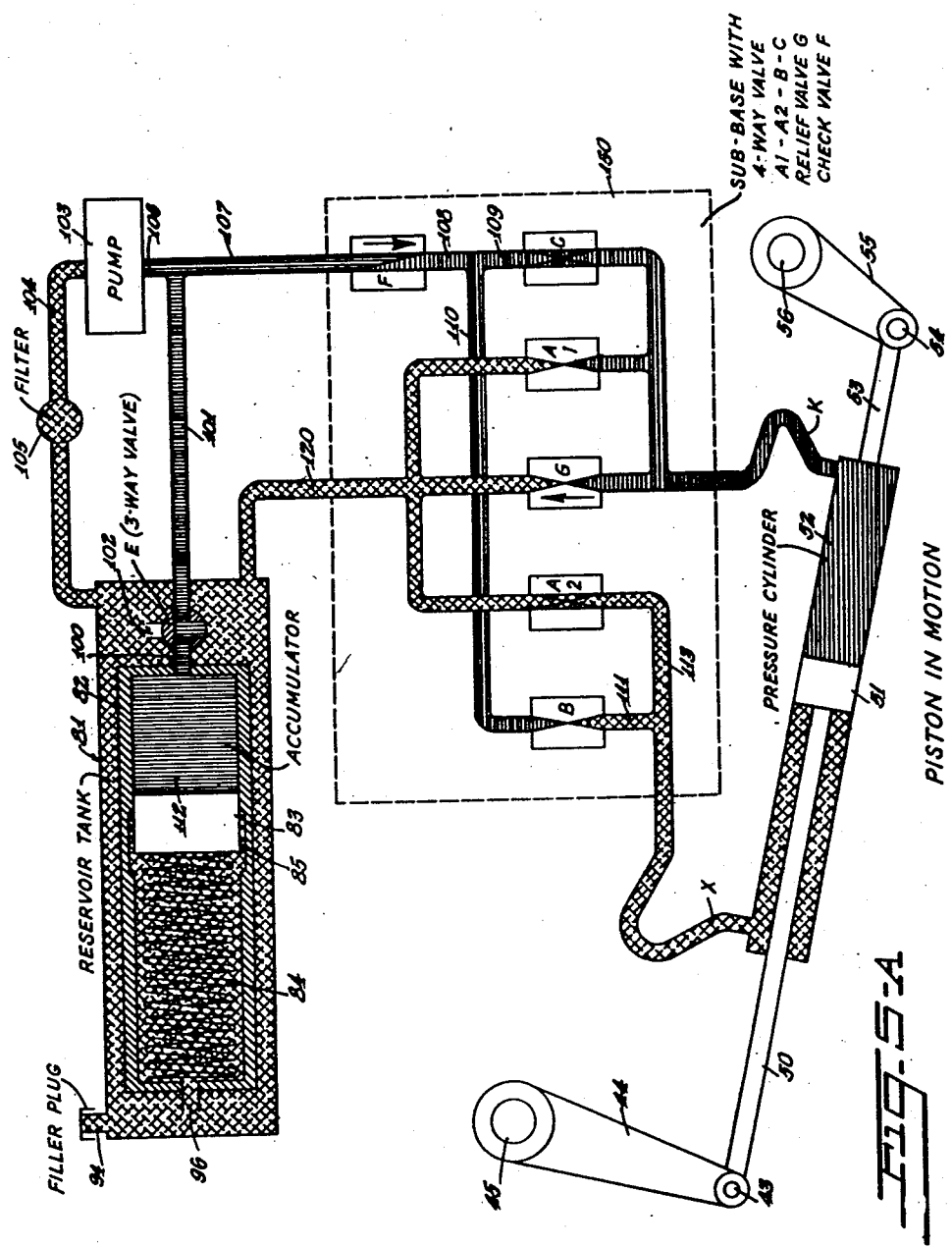

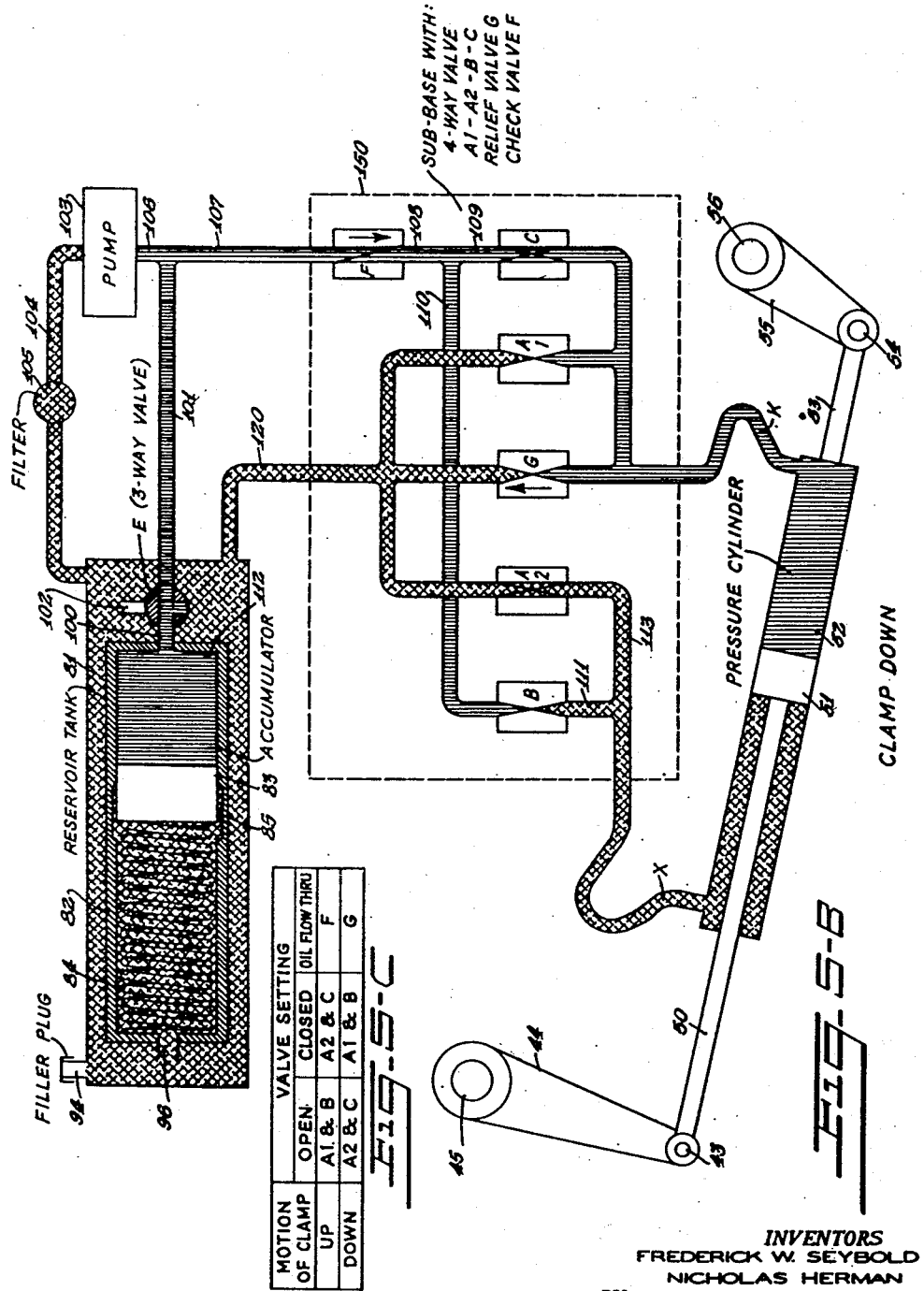

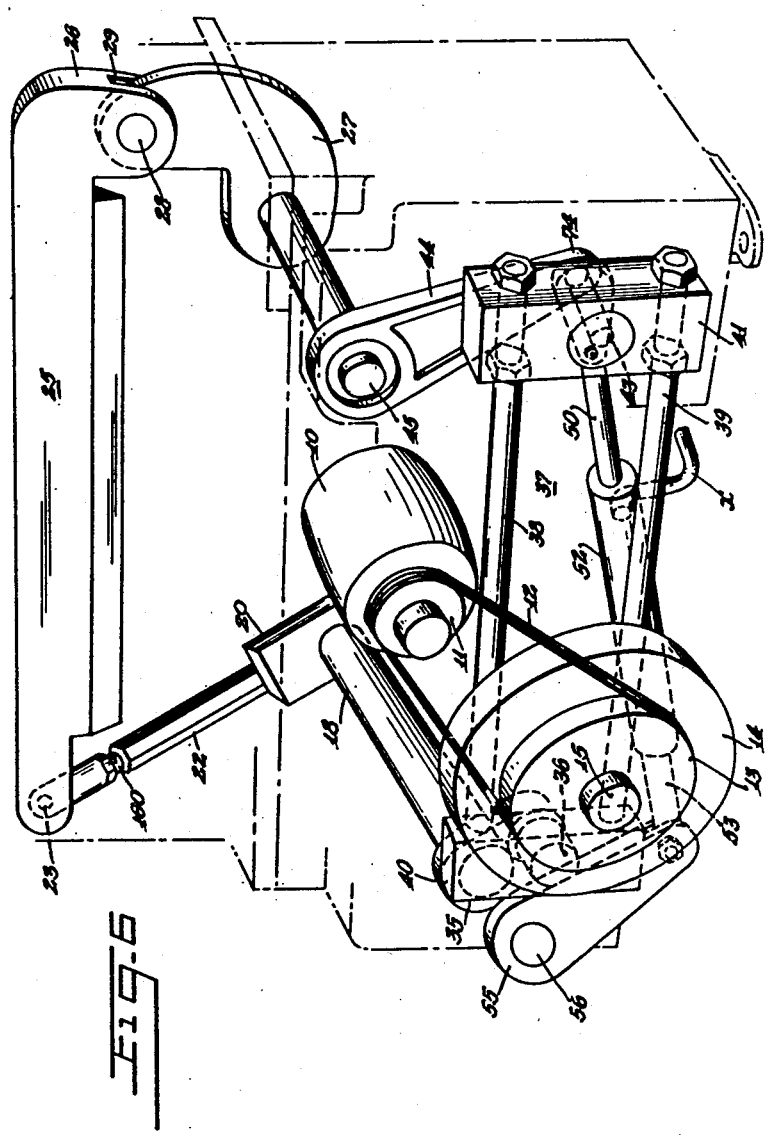

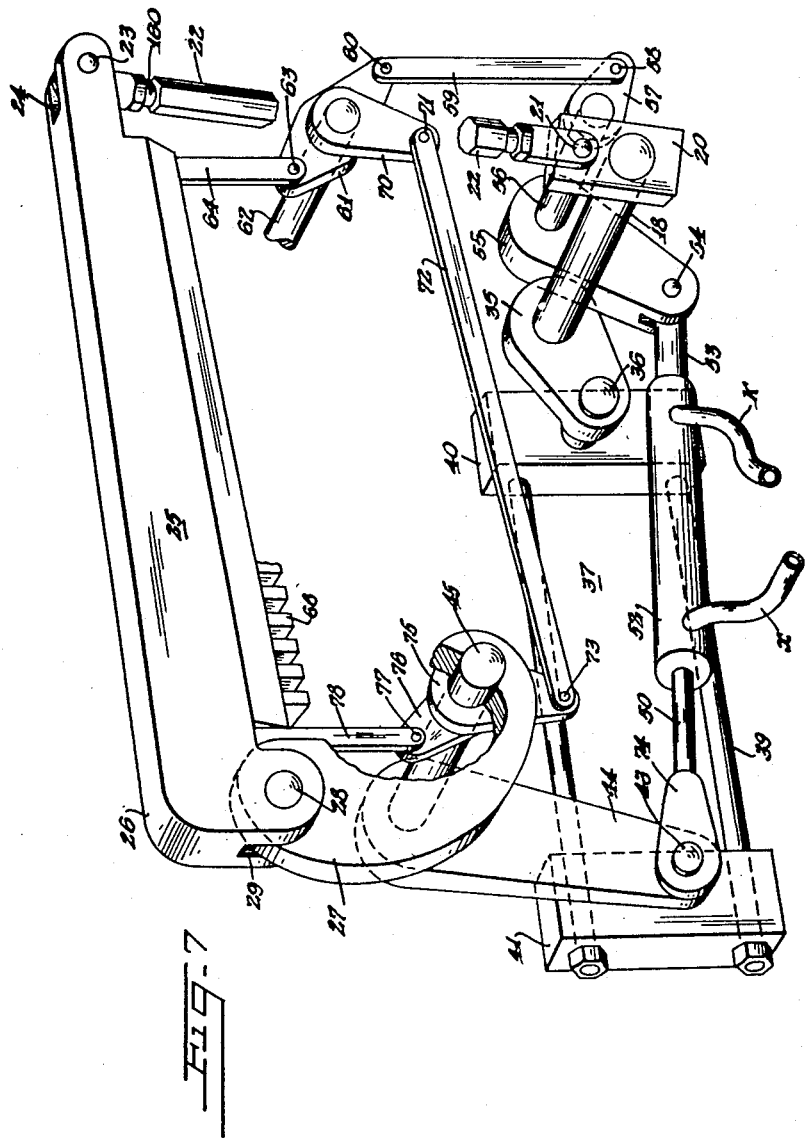

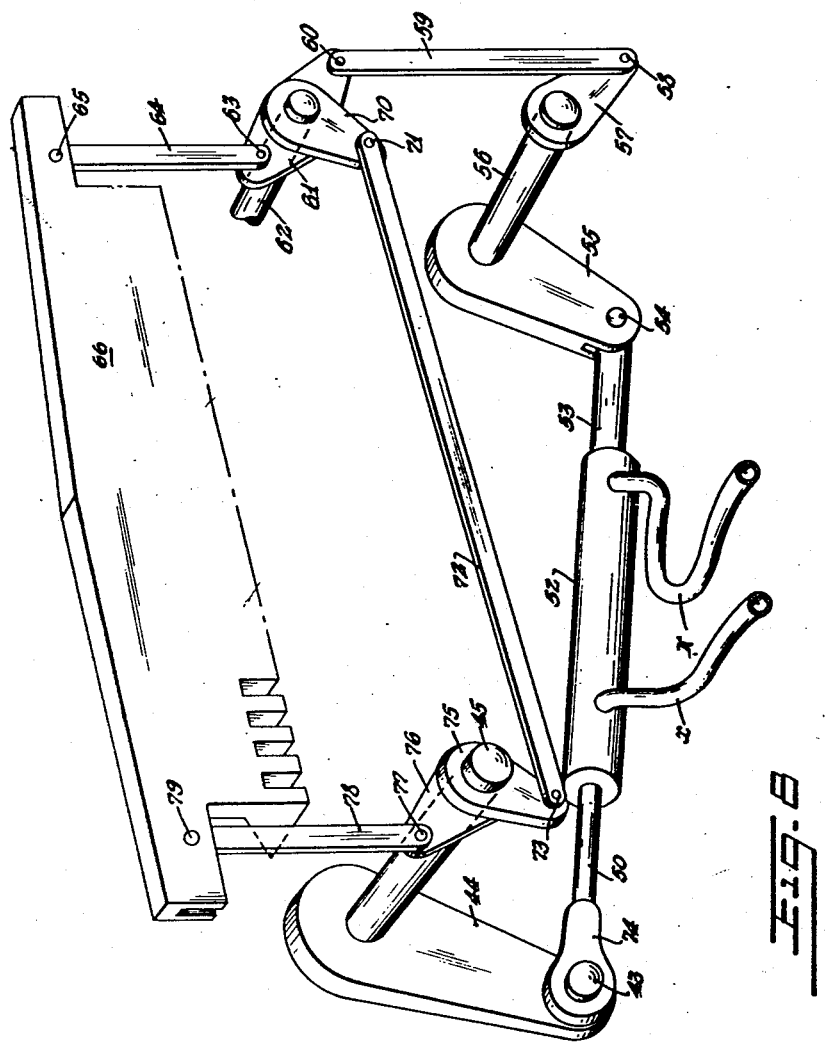

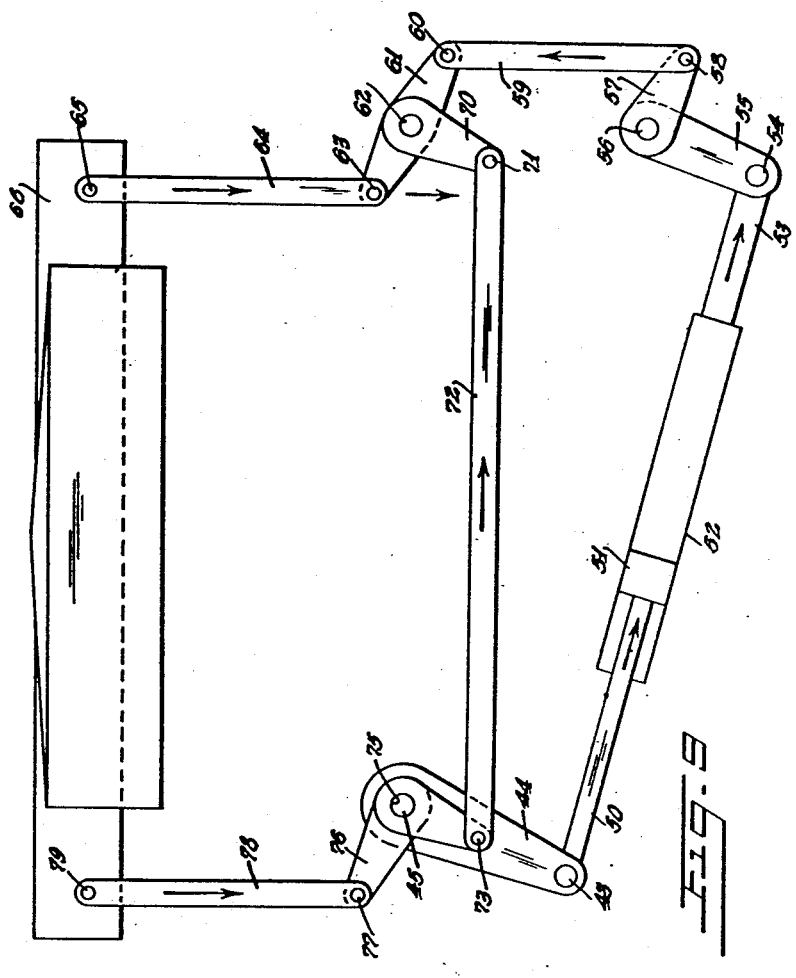

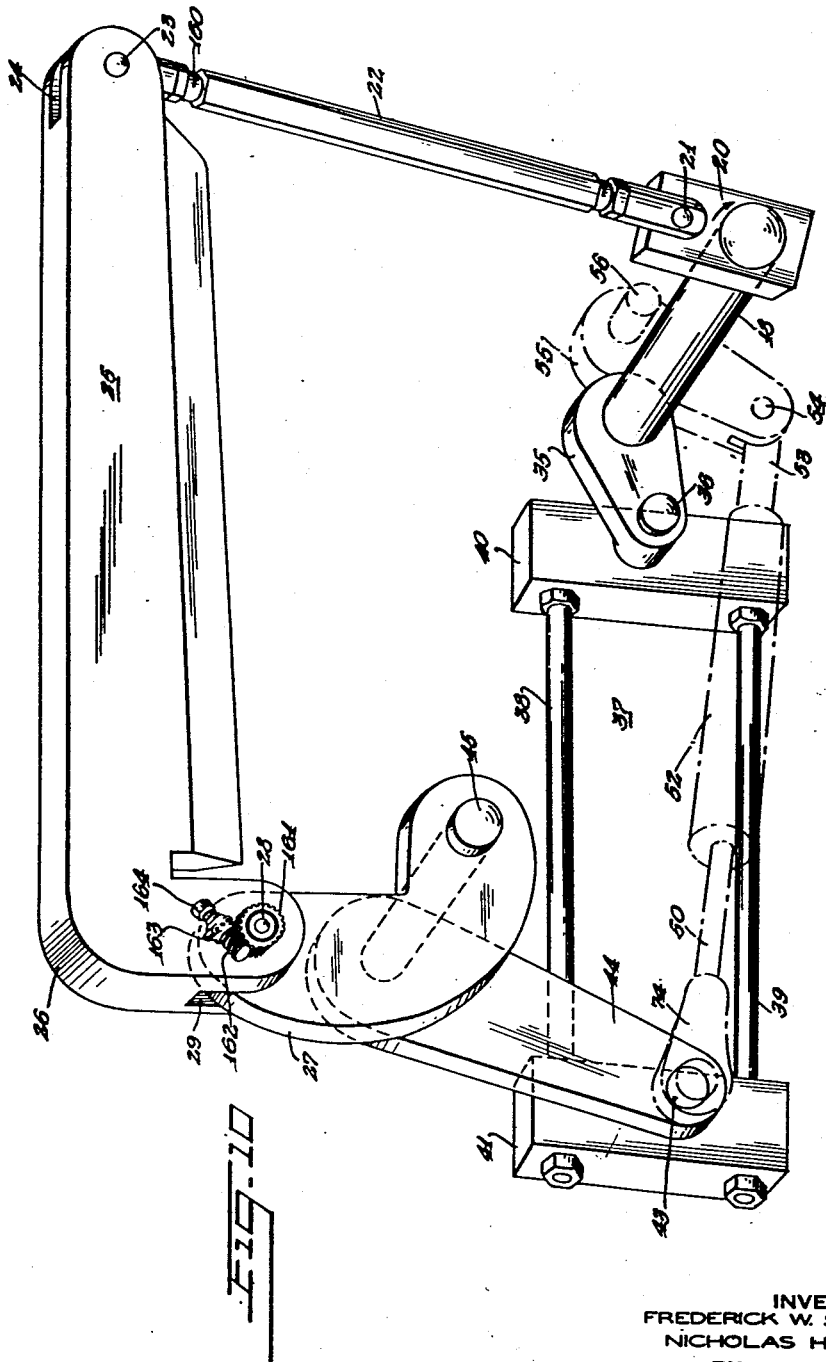

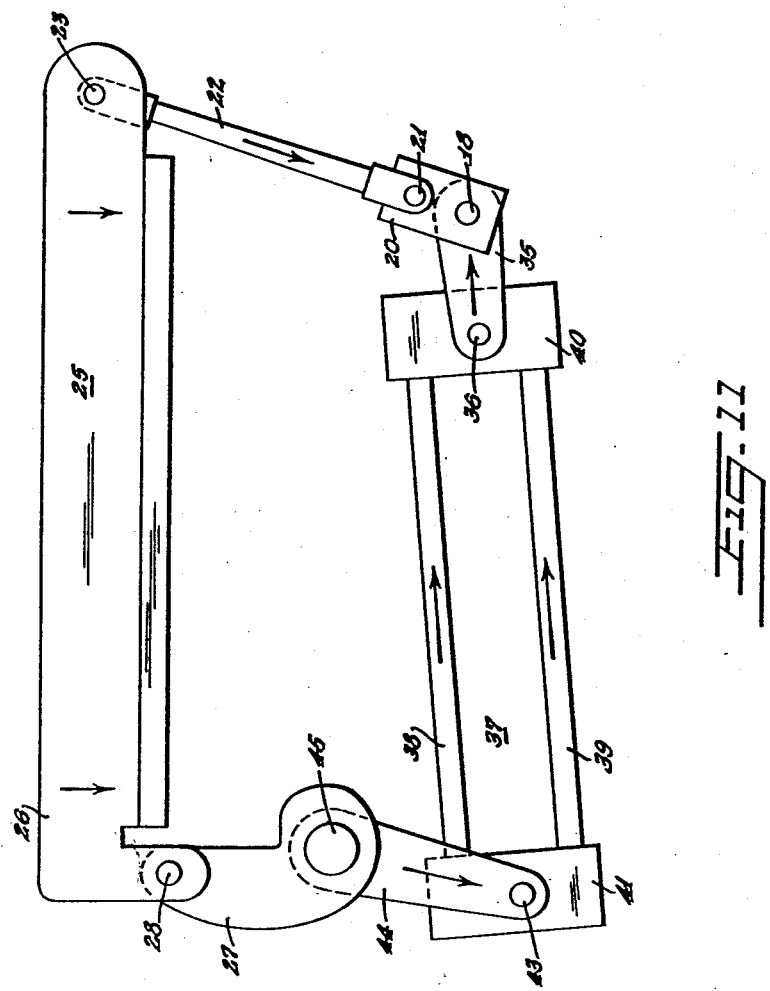

Nov. 13, 1951   F. W. SEYBOLD ET AL   2,574,501
GUILLOTINE KNIFE-IMPROVED VALUES FOR HYDRAULIC CLAMPS
Filed Sept. 9, 1949   14 Sheets-Sheet 13
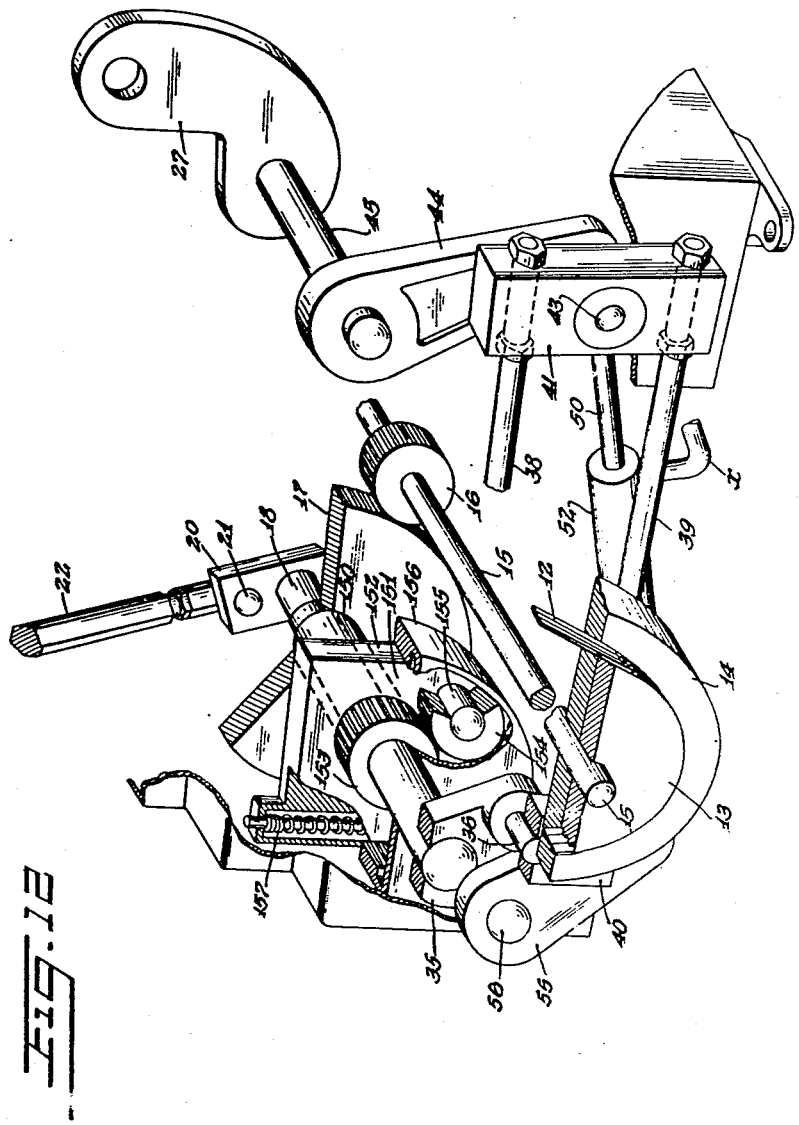
INVENTORS
FREDERICK W. SEYBOLD
NICHOLAS HERMAN
BY
ATTORNEYS Nov. 13, 1951    F. W. SEYBOLD ET AL    2,574,501
GUILLOTINE KNIFE-IMPROVED VALUES FOR HYDRAULIC CLAMPS
Filed Sept. 9, 1949    14 Sheets-Sheet 14
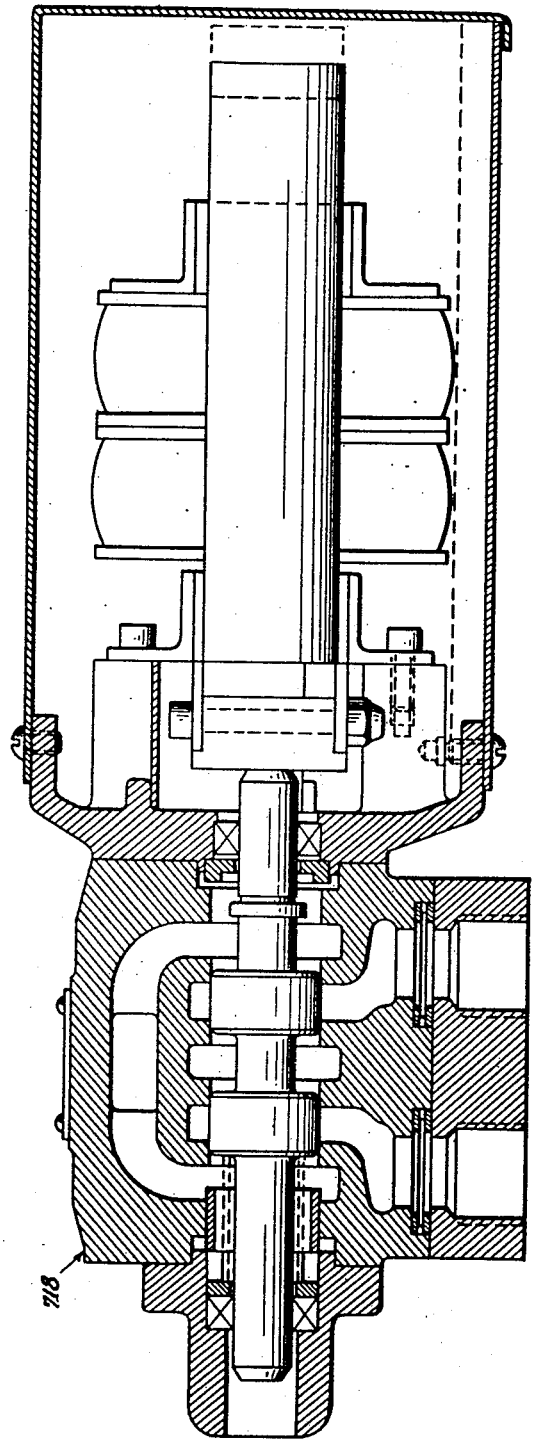
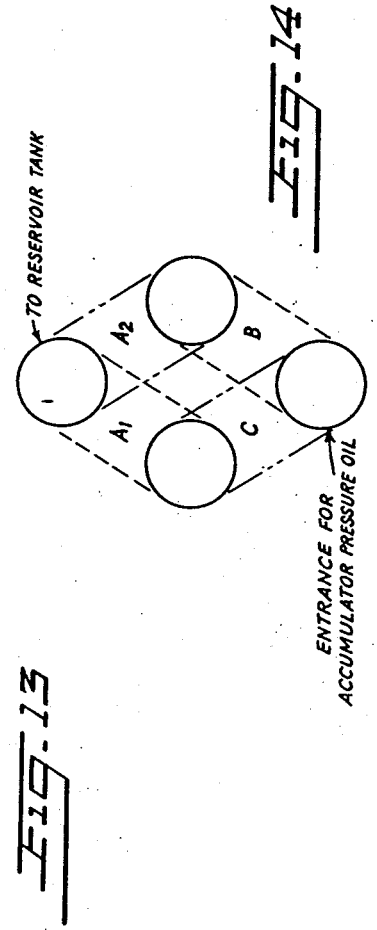
INVENTORS
FREDERICK W. SEYBOLD
NICHOLAS HERMAN
BY
Ostrolenk & Faber
ATTORNEYS Patented Nov. 13, 1951

2,574,501

UNITED STATES PATENT OFFICE 2,574,501

GUILLOTINE KNIFE-IMPROVED VALUES FOR HYDRAULIC CLAMP

Frederick W. Seybold, Westfield, N. J., and Nicholas Herman, Bronx, N. Y., assignors to E. P. Lawson Co., Inc., New York, N. Y., a corporation of New York Application September 9, 1949, Serial No. 114,786

9 Claims. (Cl. 164—51)

1

The present invention is an improvement of application Serial No. 45,285, filed August 20, 1948, and relates to guillotine type paper cutters and more particularly to hydraulically operated clamping means therefor.

Essentially, the invention contemplates connecting the knife driving means to the clamp through a telescoping fluid-filled cylinder and controlling the fluid in the cylinder so that hydraulically multiplied clamping force is obtained during the cutting stroke while nevertheless the clamp may be moved down by gravity and without hydraulic pressure during necessary operations preceding the cutting stroke.

An object of the invention is the provision of a novel guillotine-type knife and associated hydraulically operated clamping mechanism.

Another object of the invention is the provision of hydraulic clamp operating means whereby a telescoping connection between the knife drive mechanism and the clamp is controlled by admission of hydraulic fluid under pressure to one side or the other of the tube.

Another object is the provision of a hydraulic connection between the knife driving member and the driven member of the clamp comprising a closed tube on one of the members with suitable posts at each end and a piston slidable in the tube and connected to the other member wherein admission of fluid under pressure on one side or the other of the piston controls the operation of the clamp.

The primary object of the present invention is the provision of a novel hydraulic system wherein the accumulator is housed in the reservoir, the valve mechanism is simplified and external piping is reduced.

The foregoing and many other objects of the invention will become apparent in the following description and drawings in which:

Figure 1 is a front elevation of our novel machine taken beneath the knife and clamp.

Figure 2 is a top plan view of the machine taken beneath the knife and clamp.

Figure 3 is a side elevation of the machine omitting the knife and clamp elements.

Figure 4 is a schematic view of the electrical valve operating circuit.

Figure 5 is a schematic view of the hydraulic circuit when the clamp is up and the machine at rest.

Figure 5A is a view corresponding to Figure 5 showing the condition when the operator depresses the treadle to bring the clamp down and the machine is still at rest.

2

Figure 5B corresponds to Figure 5 showing the pressure prevailing during the descent of the knife.

Figure 5C is a chart tabulating the operation of the valve mechanism.

Figure 5D is a schematic fragmentary view showing another position of one of the valves.

Figure 6 is a rear view of the knife mechanism with a portion of the housing removed showing the driving means for the knife blade and the interconnection of this driving means with the drive for the clamp but omitting portions of the clamp driving mechanism.

Figure 7 is a front view of our novel machine showing the combined drive mechanism for the clamp and knife blade.

Figure 8 is a schematic fragmentary view taken from the front of our novel mechanism showing the clamp operating elements lifted out of the structure of Figure 7.

Figure 9 is a schematic view of the clamp driving elements of Figure 8.

Figure 10 is a front view of the knife driving elements lifted out of the combined view of Figure 7.

Figure 11 is a schematic view of the elements of Figure 10.

Figure 12 is a detailed view in perspective of the drive for the knife of our novel cutting machine.

Figure 13 is a longitudinal sectional view through the valve operator and its solenoid.

Figure 14 is a schematic view of the valve.

Referring first to Figure 6 which is a rear view showing primarily the knife driving elements of our novel device, the motor 10 through its pulley 11 and belts 12 drives the pulley 13 which is integral with the fly wheel 14. Fly wheel 14 rotates freely on the main drive shaft 15 (see also Figure 12) of the machine. The drive shaft 15 is provided with clutch and brake elements as well as with overload protective elements of the type shown in application Serial No. 673,289 filed January 31, 1946, now Patent No. 2,570,873, issued October 9, 1951.

The specific clutch and brake elements used, as well as the specific overload protective elements used, form no part of the present invention and, therefore, require no specific description here. The clutch and brake elements serve, however, to connect fly wheel 14 to shaft 15 at the beginning of a cycle and to disconnect fly wheel 14 from shaft 15 at the end of a cycle.

It should be understood, however, that the machine is so constructed that it will cycle once in response to a control set by the operator and will halt until a recycling operation is desired so that the knife and clamp will descend once and rise again for each cycle of operation.

Gear 16 on shaft 15 meshes with gear 17 (Figure 12) on sleeve 150, rotatably mounted on shaft 18, carried in bearing 151 on plate 152. Sleeve 150 carries gear 153 which meshes with planetary gear 154 mounted on stud 155 on plate 152. Planetary gear 154 meshes with internal gear 156 carried by knife drive shaft 18. When shaft 15 is rotated, its gear 16 drives gear 17 on sleeve 150, driving gear 153 on sleeve 150 and through gear 154 drives gear 156 on shaft 18 to drive the knife and clamp in the manner hereinafter described. Where resistance is encountered by the knife, gear 154 on its stud 155 causes the plate 152 to rotate around sleeve 150 against the compressing of spring 157. This operation is also described in application Serial No. 673,289 filed January 31, 1946, now Patent No. 2,570,873.

The knife drive shaft 18 carries at the forward end thereof the crank 20 which is pivotally connected at the crank pin 21 to the knife draw bar 22, the length of which may be made adjustable in any suitable manner, as by the threaded connection at 160 (Figure 10). The upper end of the knife draw bar 22 is pivotally connected by the pin 23 in the clevis 24 at the right end of the knife bar 25 with respect to Figures 7 and 10. Thus, a single rotational cycle of the knife drive shaft 18 will rotate the crank 20 to pull the draw bar 22 down, therefore, pulling down the right-hand end of the knife bar 25, and then will raise the bar 22 to force the right-hand end of the knife bar up.

The opposite end 26 of the knife bar is simultaneously pulled down by the heavy arm 27, the upper end of which is pivotally connected by the eccentric pin 28 in the clevis 29 at the left-hand end of the knife bar with respect to Figures 7, 10, and 11. Pin 28 (Figure 10) is eccentric and adjustable in knife bar 25 to permit adjustment of arm 27 to correspond to the adjustment at 160 at the right side. Gear 161 on pin 28 meshes with worm 162, carried in bracket 163 and having the hexagonal end 164 which may be rotated by a wrench to cause gear 161 and pin 28 to rotate to vary the adjustment.

Arm 27 rotates counterclockwise with respect to Figures 7 and 11 simultaneously with the downward motion of the draw bar 22. The arm 27 is then rotated clockwise to raise the left-hand end 26 of the knife bar 25 simultaneously with the upward or return stroke of the draw bar 22.

Thus unison of motion is achieved by placing an additional crank 35 at the rear end of the knife drive shaft 18 which is keyed to the shaft 18. The outer end of crank 35 is pivotally connected by crank pin 36 to the connecting rod 37 which comprises the parallel bars 38 and 39 connected and braced by the bracing bars 40 and 41 at opposite ends. Pin 36 carries the bracing bar 40. Bracing bar 41 at the left side is carried by the pin 43 which is pivotally connected to the end of the lever 44. Lever 44 is keyed to the shaft 45 to which in turn the arm 27 is keyed. Therefore, rotation of the knife driving shaft 18 in addition to rotating crank 20 to pull down the draw bar 22 also rotates crank 35 to pull the composite connecting rod 37 to the right with respect to Figures 10 and 11.

This results in pulling the lower end of lever 44 to the right and results in counterclockwise rotation of shaft 45 and corresponding counterclockwise rotation of the arm 27 with respect to Figures 10 and 11. Therefore, simultaneously with the downward motion of draw bar 22, the pin 28 and the left-hand end 26 of the knife bar 25 is drawn downwardly. The counterclockwise rotation of the arm 27 causes the knife bar 25 to swing laterally to the left as it is being pulled down, thereby producing the proper transverse motion of the knife bar 25 for efficient cutting while the knife drive shaft 18 moves through the first half cycle. Further rotation thereof causes the bar 22 to be pushed up, pushing up the right-hand end of the knife bar 25.

At the same time the passage of crank 35 through the second half of the cycle causes it on continuation of its movement to push the composite connecting rod 37 to the left, thereby reversing the operation of shaft 45 and causing it and the arm 27 to rotate in a clockwise direction to lift up the left-hand end 26 of the knife bar 25 simultaneously with the rise of the right-hand end of the knife bar 25. The knife bar is thus pushed up simultaneously at both ends and swung at the same time laterally to the right during this rising motion in order to be ready for the next operation.

The clamp operation is shown in Figures 7, 8, and 9. Arm 44 and the end member 41 of the composite connecting rod 37 are pivotally connected by pin 43 also to the piston rod 50 of the piston 51 which in turn is slidable in the cylinder 52. The end of cylinder 52 has an extension 53 which is pivotally connected at 54 to the arm 55 keyed to the shaft 56. Shaft 56 carries the lever 57 keyed thereto. Lever 57 is pivotally connected by pin 58 to the connecting link 59. Link 59 is pivotally connected by pin 60 to the bell crank lever 61 which is free to rotate on the shaft 62 secured in the frame of the machine.

The opposite end of lever 61 is connected by pin 63 to the pull down link 64 which is pivotally connected at 65 to the right-hand end of clamp 66 (with respect to Figures 7, 8 and 9). The connection at 65 to the clamp 66 and the connection at the opposite end of the clamp hereinafter described may take any form which may be desired such as the adjustable connection described in my aforementioned application Serial No. 673,289 filed January 31, 1946, now Patent No. 2,570,873.

The clamp as well as the knife bar may also have the specific construction described in the aforementioned patent and may slide in channels and guides of the specific shape and formation therein described. Such specific guide means and such specific connections require no further description here since they form no part of the present invention.

Bell crank lever 61 has a depending arm 70 and its lower end is connected by pin 71 to the connecting link 72 which in turn is connected by pin 73 to the bell crank 74. Bell crank 74 is provided with the bore 75 which is a loose rotatable fit around the shaft 45.

The upper end 76 of bell crank 74 is connected by pin 77 to the pull down bar 78 which in turn is pivotally connected at 79 to the left-hand end of clamp 66.

When now the knife bar 25 is drawn down so that the connecting rod 37 and the lower end of arm 44 is moved to the right with respect to Figures 7, 8 and 9, pin 43 is forced to the right, pushing the piston rod 50 to the right with respect to these figures.

Assuming for the time being that piston rod 50, piston 51, cylinder 52 and cylinder extension 53 are a single solid unit, the movement of piston rod 50 to the right and downward with respect to Figure 9 results in corresponding counterclockwise rotation of arm 55 and in corresponding rotation of shaft 56 and lever 57. This causes the link 59 to rise, thereby rotating the lever 61 counterclockwise to lift the pin thereof and to lower the pin 63 thereof. This pulls down the pull bar 64, pulling down the right-hand end of the clamp 66.

The counterclockwise rotation of bell crank lever 61 causes the arm 70 to rotate similarly moving the pin 71 and the connecting link 72 to the right and causing the bell crank lever 74—76 to rotate counterclockwise, thereby pulling down pin 77, pull bar 78, and therefore pulling down the left-hand end of the clamp 66 together with the right-hand end.

On a reversal of movement of arm 44 so that the lower end thereof move to the left in the manner previously described in connection with the operation of the knife bar, and again treating the hydraulic element 50—51—52—53 as a single solid connection, the operation of arm 55 and lever 57, link 59, lever 61 and pull bar 64 is reversed to raise the right-hand end of clamp 66; the arm 70 has its lower end rotated to the left pushing the connecting link 72 to the left, rotating the bell crank lever 74—76 clockwise and pushing up the pull bar 78 and the left-hand side of the clamp.

Thus during a single cycle of operation of the knife a lowering of the knife is accompanied by a lowering of the clamp and a raising of the knife is accompanied by a raising of the clamp. The elements are arranged and timed so that the clamp engages the paper surface before the knife enters the paper and leaves the paper surface after the knife has risen above it.

The elements must also be so arranged that the clamp may be caused to descend independently of the knife. That is the principal reason why the bell crank lever 74—76 is a rotatable fit around the shaft 45 and is not keyed thereto.

Bell crank lever 74—76 may as readily be rotatable on another pivot but for convenience in constructing the mechanism, it has been mounted for rotation around shaft 45.

The connection 43—50—51—52—53—54 from the knife operating mechanism to the clamp in order to operate the clamp in synchronism with the operation of the knife is a hydraulic connection as above noted in order to obtain properly controlled clamping pressure and to permit independent operation of the clamp.

The present structure which includes piston 51 and cylinder 52 in the mechanical path from the knife operating apparatus to the clamp operating means provides simplified hydraulic method for controlling the clamping pressure.

This is accomplished by the valve controls of the hydraulic system shown in Figures 1 to 4 and especially the schematic views of Figures 5, 5A and 5B.

In addition to the housing of the accumulator in the reservoir which eliminates a substantial amount of external piping the utilization of a sub-base mounting for my four way valve, the pressure adjusting valve and the check valve further reduces the external piping to a minimum.

In front of the machine Figures 1 to 3 there is located a foot treadle 600 which is fixed to brackets 700. These brackets are secured to the shaft 701. This shaft 701 is pivotally journalled in the bracket 702 which is fastened to the column of the machine.

On the right-hand side shaft 701 is supported in the bracket 703. On the shaft 701 a lever 704 is secured and to this lever is connected the end of cable 705. This cable passes over a pulley 706 supported on a stud 707 fastened in the bracket 708a which is also secured to the column of the machine.

Cable 705 then passes horizontally to the rear of the machine to the pulley 708 which is turning on the stud 709, the latter being secured to the top cover of the reservoir tank (hereinafter described).

Thence, the cable 705 is connected to the pin 110 on the lever 111 which is pivoted on the stud 112, the latter being fastened also to the top cover of the reservoir tank. A spring 113 is also pivoted on the pin 110 and the other end of the spring is connected to the anchor 114.

The function of this spring is to return the treadle again to its uppermost position after it has been depressed and the foot pressure has been released.

The other arm of lever 111 is connected to a push pin 115 which passes through a bracket 116. This push pin makes contact with the plunger of the solenoid 717 which operates the four-way valve 718. (The function of which is hereinafter described in connection with Figures 5, 5A and 5B.)

Therefore, the manual operation of the foot treadle through the lever cable connection pushes on the plunger of the solenoid and mechanically shifts the valve 718.

In this manner, the operator has complete control over the descent or ascent of the clamp. This is to be preferred because if the valve 718 were operated entirely electrically as soon as electric contact or circuit has been made the clamp then would descend very rapidly possibly resulting in injury to the operator's hands. With this construction the operator has a certain amount of "feel" whereby by releasing his foot a slight amount the clamp will go up again thereby retaining perfect control over the clamp.

The operator has the choice of bringing down the clamp by foot pressure on the treadle or of operating the starting handle 200 in the manner described in my prior application above mentioned to operate the knife blade which will close an electrical circuit to energize the solenoid to bring down the clamp.

The four-way valve 718 is represented by the ports B, A1, A2 and C on Figures 5, 5A and 5B (Figures 13 and 14). The pressure adjusting valve G as shown in Figures 5, 5A and 5B and mounted on the sub-base shown in Figure 2 is provided with an adjustment knob 729 which is accessible from the front of the machine.

Since this valve is located in the rear of the machine, it is important that the pressure can be regulated and adjusted conveniently by the operator.

The adjusting mechanism for valve G includes the adjusting stem 719 connected to the valve G. A bevel gear 720 is attached to stem 719. A similar bevel gear 721 meshes therewith, and a vertical shaft 722 is supported in brackets 723 and 724. At the end of shaft 722 another bevel gear is fastened which meshes with the bevel gear 725 which meshes with a similar bevel gear 726 fastened to a long horizontal shaft 727. This shaft passes over the top of the column of the machine and underneath the table where it is supported in bracket 728 fastened to the column of the machine.

On the end of this shaft is fastened the knob 729 so that the shaft can be conveniently turned in either direction. When the correct adjustment has been attained, the shaft is locked by means of nut 730. This nut is threaded and fits on threads on the shaft 727 and thereby can be securely locked in this position.

A reservoir tank 81 is provided having a filler opening 94 which may be plugged. An accumulator or high pressure tank 82 is housed within the reservoir. Accumulator 82 has a piston 83 to which pressure is applied by compression spring 84. Oil at reservoir pressure may enter the rear of piston 83 through opening 96. A pressure relief groove 85 is provided which is uncovered when piston 83 is forced back too far by excessive pressure to permit the oil under excess pressure to escape back into reservoir 81. Chamber 112 of accumulator 82 on the right side of piston 83 is the high pressure chamber.

Pipe 100 leads to the three way valve E. Three way valve E is normally in the position shown in Figures 5, 5A and 5B where it connects pipe 100 with pipe 101.

When three-way valve is turned to the position of Figure 5D it connects the pipe 100 with outlet 102 into the reservoir to relieve the pressure in chamber 112. It may also be turned 180° from the position of Figure 5D to relieve pressure from pipe 101 into the reservoir.

Pump 103 is provided connected by pipe 104 and filter 105 on the intake side to the reservoir and pipe 106 to pipes 101 and 107 on the output or pressure side so that pressure may be built up when the machine is initially placed in operation or after a period of idleness.

In Figures 5, 5A and 5B, the pressure fluid is shown with vertical hatching and the atmospheric or no pressure fluid is shown with cross hatching.

Reference should also be made to the chart of Figure 5C. To maintain the clamp up, valve A1 and B are opened and valves A2 and C are closed. Fluid under accumulater pressure flows through pipe 107 and check valve F to pipes 108, 109, 110. Pipe 109 is blocked by the closing of valve C. The pressure fluid goes through pipe 110 and open valve B into pipe 111, tube X and pipe 113. Pipe 113 is blocked by closed valve A2. Pipe X communicates with the upper side of cylinder 52 creating pressure between the left face of piston 51 and the left wall of cylinder 52 and pushing the cylinder to the left. This pulls on rod 53 and crank arm 55 to hold the clamp up.

When the piston 51 is operated by rod 50 from crank arm 44 valves A2 and C are opened and valves A1 and B are closed.

Piston 51 moving to the right compresses the fluid to the right forcing cylinder 52 to the right and pushing crank 55 to the right to lower the crank.

Valve C connects pipe 109 and check valve F with pipe K leading to the right side of the cylinder 52. Valve A2 connecting the left side of the cylinder to the reservoir is open reducing the pressure in the left side of the cylinder. Valve B closes the by-pass connection from the right side of the cylinder through valves B and C to the left side. The accumulator pressure from check valve F and open valve C starts the cylinder and clamp down ahead of the knife. As the clamp strikes the paper stack, it is halted but the continued movement of knife and of crank 44 drives the piston 51 further to the right increasing the pressure to clamping pressure (horizontal hatch lines). Check valve F prevents reverse flow up pipe 108. Pressure relief valve G permits the excess pressure to drain back toward the reservoir through pipe 120. The adjustment of the opening of relief valve G (above described) determines the rate of equalization of pressure on both sides of valve G and determines the clamping pressure.

When the clamp is in the fully clamped position of Figure 5B, check valve F, by permitting accumulator pressure to enter the pipe K whenever the pressure therein drops below accumulator pressure, prevents release of all pressure on the clamp through relief valve G.

As seen in Figure 3, the accumulator is completely housed in reservoir 82 and the valve block 150 containing all valves is mounted on the reservoir eliminating all external piping except the flexible connections X and K.

When the operator depresses lever 200 shaft 201 (see Figure 3) as in the above mentioned application moves to the right and clutch 202 is connected to the flywheel 14. When shaft 201 is in the disengaged position, the head of cap screw 203 depresses the operator 204 of the normally closed limit switch 205 whereby the solenoid 717 which operates the four-way valve 718 is in the de-energized condition (see also Figure 4). Upon movement of shaft 201 to the right, switch 205 will close and energize the coil 210 of relay 211 whereby solenoid 717 is energized and shifts the openings of the four way valve from the position of Figure 5 to the positions of Figures 5A and 5B.

In order to permit stopping of the cutting knife during its descent without releasing the clamping pressure, a second switch 220 is provided which also has normally closed contacts so that upon closing of the contacts 1—2 of the switch 205, the coil 210 becomes energized and closes the three contacts of the relay 211 whereby the solenoid 717 becomes energized. The function of switch 220 is to provide a maintaining circuit to permit the opening of the contacts 1—2 of the switch 205 without de-energizing the coil 210 and also the solenoid 717. In this manner it is possible to disengage the clutch 202 of the machine and bring it to rest without releasing the clamping pressure.

Cam 220, which is fastened to crank 35, rotates and after it is rotated slightly more than three-fourths of a revolution, its outer periphery will depress the operator 225 of the second switch 226 whereby the electric circuit to solenoid 717 is interrupted and the valves B, A2, A1 and C are returned to the position shown in Figure 5. Near the end of the cycle, shaft 201 will move again to the left and cap screw 204 will again open switch 205 shifting the valves back to the position of Figure 5 to produce upward motion of the clamp. The circuit arrangement is clearly seen in Figure 4.

The operation of foot treadle 600 will shift the solenoid armature through the lever 711 as above described to operate the valves 718 independently of the starter lever 700 as above described.

In the foregoing we have described our invention solely in connection with specific illustrative embodiments thereof. Since many modifications and variations of our invention will now be obvious to those skilled in the art, we prefer to be bound not by the specific disclosures herein contained but only by the appended claims.

We claim:
1. Reciprocating sheet cutting mechanism comprising a vertically reciprocating knife; driving members therefor and a vertically reciprocating clamp member; means connected between the knife driving members and the clamp for driving the clamp; said means including a fluid filled coupling between the knife driving members and the clamp, the elements of the fluid filled coupling being movable with respect to each other independently of the movement of the knife driving members and control apparatus for the elements of the fluid filled coupling; said control apparatus being operable independently of the knife driving means to operate the clamp; a solenoid having a coil and an armature, a connection between said armature and said control apparatus; means operable by the knife driving members for controlling the energization and de-energization of said solenoid coil.

2. Reciprocating sheet cutting mechanism comprising a vertically reciprocating knife; driving members therefor and a vertically reciprocating clamp member; means connected between the knife driving members and the clamp for driving the clamp; said means including a fluid filled coupling between the knife driving members and the clamp, the elements of the fluid filled coupling being movable with respect to each other independently of the movement of the knife driving members and control apparatus for the elements of the fluid filled coupling; said control apparatus being operable independently of the knife driving means to operate the clamp; a solenoid having a coil and an armature, a connection between said armature and said control apparatus; means operable by the knife driving members for controlling the energization and de-energization of said solenoid coil, and a lever independently operable and connected to said control apparatus for operating the same while the solenoid coil remains de-energized.

3. Reciprocating sheet cutting mechanism comprising a vertically reciprocating knife; driving members therefor and a vertically reciprocating clamp member; means connected between the knife driving members and the clamp for driving the clamp; said means including a fluid filled coupling between the knife driving members and the clamp, the elements of the fluid filled coupling being movable with respect to each other independently of the movement of the knife driving members and control apparatus for the elements of the fluid filled coupling; said control apparatus being operable independently of the knife driving means to operate the clamp; a solenoid having a coil and an armature, a connection between said armature and said control apparatus; means operable by the knife driving members for controlling the energization and de-energization of said solenoid coil, and a lever independently operable and connected to said control apparatus for operating the same while the solenoid coil remains de-energized; a foot treadle; a connection between said foot treadle and said lever.

4. Clamping mechanism comprising a reciprocating clamp movable in one direction to clamping position and movable in an opposite direction to released position; a driving member and a driven member connected to the clamp; said driving member comprising a piston; said driven member comprising a cylinder; said piston being reciprocal in said cylinder and dividing said cylinder into a first driving chamber for movement of the clamp in the clamping direction and a second driving chamber for movement of the clamp in the releasing direction; a fluid supply and a source of fluid under pressure; control means for admitting fluid from the source of fluid under pressure to one chamber and simultaneously opening the other chamber to the fluid supply; said source of fluid under pressure comprising an accumulator chamber; and said fluid supply comprising a reservoir chamber; said accumulator chamber being housed within said reservoir chamber.

5. Clamping mechanism comprising a reciprocating clamp movable in one direction to clamping position and movable in an opposite direction to released position; a driving member and a driven member connected to the clamp; said driving member comprising a piston; said driven member comprising a cylinder; said piston being reciprocal in said cylinder and dividing said cylinder into a first driving chamber for movement of the clamp in the clamping direction and a second driving chamber for movement of the clamp in the releasing direction; a fluid supply and a source of fluid under pressure; control means for admitting fluid from the source of fluid under pressure to one chamber and simultaneously opening the other chamber to the fluid supply; said source of fluid under pressure comprising an accumulator chamber; and said fluid supply comprising a reservoir chamber; said accumulator chamber being housed within said reservoir chamber; said control means being mounted on said reservoir chamber.

6. Clamping mechanism comprising a reciprocating clamp movable in one direction to clamping position and movable in an opposite direction to released position; a driving member and a driven member connected to the clamp; said driving member comprising a piston; said driven member comprising a cylinder; said piston being reciprocal in said cylinder and dividing said cylinder into a first driving chamber for movement of the clamp in the clamping direction and a second driving chamber for movement of the clamp in the releasing direction; a fluid supply and a source of fluid under pressure; control means for admitting fluid from the source of fluid under pressure to one chamber and simultaneously opening the other chamber to the fluid supply; said source of fluid under pressure comprising an accumulator chamber; and said fluid supply comprising a reservoir chamber; said accumulator chamber being housed within said reservoir chamber; said control means comprising a plurality of valves; connections between said valves and said accumulator and reservoir chambers; a block mounted on said reservoir chamber containing said valves and said connections.

7. Clamping mechanism comprising a reciprocating clamp movable in one direction to clamping position and movable in an opposite direction to released position; a driving member and a driven member connected to the clamp; said driving member comprising a piston; said driven member comprising a cylinder; said piston being reciprocal in said cylinder and dividing said cylinder into a first driving chamber for movement of the clamp in the clamping direction and a second driving chamber for movement of the clamp in the releasing direction; a fluid supply and a source of fluid under pressure; control means for admitting fluid from the source of fluid under pressure to one chamber and simultaneously opening the other chamber to the fluid supply; said source of fluid under pressure comprising an accumulator chamber; and said fluid supply comprising a reservoir chamber; said accumulator chamber being housed within said reservoir chamber; said control means comprising a plurality of valves; connections between said valves and said accumulator and reservoir chambers; a block mounted on said reservoir chamber containing said valves and said connections, and additional connections between said valves and said cylinder chambers.

8. Reciprocating sheet cutting mechanism comprising a vertically reciprocating knife; driving members therefor and a vertically reciprocating clamp member; means connected between the knife driving members and the clamp for driving the clamp; said means including a fluid filled coupling between the knife driving members and the clamp, the elements of the fluid filled coupling being movable with respect to each other independently of the movement of the knife driving members and control apparatus for the elements of the fluid filled coupling; said control apparatus being operable independently of the knife driving means to operate the clamp; means for operating said control apparatus electrically; a switch connected in said operating means; apparatus for closing said switch on initiation of the action of the knife driving members to energize said means.

9. Reciprocating sheet cutting mechanism comprising a vertically reciprocating knife; driving members therefor and a vertically reciprocating clamp member; means connected between the knife driving members and the clamp for driving the clamp; said means including a fluid filled coupling between the knife driving members and the clamp, the elements of the fluid filled coupling being movable with respect to each other independently of the movement of the knife driving members and control apparatus for the elements of the fluid filled coupling; said control apparatus being operable independently of the knife driving means to operate the clamp; means for operating said control apparatus electrically; a switch connected in said operating means; apparatus for closing said switch on initiation of the action of the knife driving members to energize said means; a second switch connected in said operating means for maintaining the energization thereof when said first switch is opened at an intermediate portion of the cycle; apparatus for opening said second switch near the completion of a cycle of said knife driving members.

FREDERICK W. SEYBOLD.
NICHOLAS HERMAN.

No references cited.